United States Patent [19]

Soma

[11] Patent Number: 5,293,158
[45] Date of Patent: Mar. 8, 1994

[54] X-Y DIRECTION INPUT DEVICE
[75] Inventor: Masahiro Soma, Furukawa, Japan
[73] Assignee: Alps Electric Co., Ltd., Tokyo, Japan
[21] Appl. No.: 878,673
[22] Filed: May 5, 1992
[51] Int. Cl.$^5$ .............................................. G09G 3/02
[52] U.S. Cl. .................................... 345/161; 345/156
[58] Field of Search ............................. 340/706, 709; 250/237 G; 200/6 A

[56] References Cited

U.S. PATENT DOCUMENTS

| | | | |
|---|---|---|---|
| 4,439,672 | 3/1984 | Salaman | 250/237 G |
| 4,670,743 | 6/1987 | Zemke | 340/709 |
| 4,680,577 | 7/1987 | Straayer | 340/709 |
| 4,786,768 | 11/1988 | Langewis | 340/709 |
| 4,879,556 | 11/1989 | Duimel | 340/709 |
| 5,019,677 | 5/1991 | Menen | 340/709 |
| 5,086,296 | 2/1992 | Clark | 340/706 |

FOREIGN PATENT DOCUMENTS

| | | | |
|---|---|---|---|
| 0009751 | 1/1984 | Japan | 340/709 |
| 0041047 | 3/1984 | Japan | 340/709 |
| 8604166 | 7/1986 | PCT Int'l Appl. | 340/709 |

Primary Examiner—Alvin E. Oberley
Assistant Examiner—Minsun Oh
Attorney, Agent, or Firm—Guy W. Shoup; Patrick T. Bever

[57] ABSTRACT

The present invention relates to an X-Y direction input device which shifts a cursor on a screen in any direction, and particularly to an X-Y direction input device capable of not only decreasing its thickness to realize a compact size but increasing its resolution or realizing superior operability. An X-Y direction input device comprises a casing for forming an outer body and an operating body accommodated in the casing to be mutually shiftable so that a cursor displayed on a display apparatus can be shifted in any direction in response to a shifting motion of this operating body. This input device comprises a base plate on which an X-direction pattern and a Y-direction pattern are respectively provided, a first holder which is provided to be shiftable in a Y-direction, a second holder which is provided to be shiftable in an X-direction, a plurality of cover plates covering an opening formed on the casing and provided to be shiftable independently with each other. And the operating body includes an engaging portion engaging with the first and second holders and a projection exposing through an opening formed on the casing. Furthermore, the first holder is guided at its both end portions and its intermediate portion in the Y-direction and the second holder is guided at its both end portions and its intermediate portion in the X-direction, thereby smoothing the movement of the operating body.

4 Claims, 9 Drawing Sheets

X-Y DIRECTION INPUT DEVICE

BACKGROUND OF THE INVENTION

The present invention relates to an X-Y direction input device which shifts a cursor on a screen in any direction.

There has been known a so-called "mouse" as an X-Y direction input device which shifts a cursor displayed on a screen of a display apparatus in any direction. This "mouse" includes a ball as a operating body and a casing which accommodates this ball. When an operator shifts this casing on a base, signals of an X-direction and a Y-direction are produced by a pair of rotary encoders in accordance with a rotational movement of the ball. This X-Y direction input device causes the cursor to shift on the screen in any direction based on the signals.

Recently, there is a trend toward thinner personal computer such as a lap-top type computer. In order to respond to this trend, there is a corresponding need of making an X-Y direction input device as thin as possible. However, in the above described conventional X-Y direction input devices, there was a problem such that an overall shape of the casing becomes significantly large because of rotary type electric parts such as a ball, a rotary encoder, and a rotary volume, resulting in that the conventional X-Y direction input devices do not fit the lap-top type personal computer.

SUMMARY OF THE INVENTION

Accordingly, the present invention has a purpose, in view of above-described problems encountered in the prior art technologies and needs, to provide an X-Y direction input device capable of not only decreasing the thickness of its casing to realize a compact size, but also increasing its resolution.

To accomplish this end, according to the present invention, there is provided an X-Y direction input device which comprises a casing for forming an outer body and an operating body accommodated in the casing to be mutually shiftable so that a cursor displayed on a display apparatus can be shifted in any direction in response to a shifting motion of this operating body relative to the causing, said X-Y direction input device further comprising a base board on which an X-direction pattern and a Y-direction pattern are provided; a first holder which holds a detecting element facing the Y-direction pattern and is shiftable in a Y-direction; a second holder which holds a detecting element facing the X-direction pattern and is shiftable in an X-direction; a plurality of cover plates which substantially cover openings formed on the casing and are capable of shifting independently with each other; and said operating body including an engaging portion engaging with said first and second holders and a projection projecting from the cover plates and exposed through the opening of the casing.

Furthermore, the present invention has a purpose to provide an X-Y direction input device capable of not only reducing the thickness of its casing but realizing superior operability.

To this end, according to the present invention, there is provided an X-Y direction input device comprising a base board on which an X-direction pattern and a Y-direction pattern are provided; a first holder which holds a detecting element facing the Y-direction pattern; a first end-portion guide means for guiding both ends of the first holder in a Y-direction; a second holder which holds a detecting element facing the X-direction pattern; a second end-portion guide means for guiding both ends of the second holder in an X-direction; and an operating body including an engaging portion engaging with said first and second holders and a projection exposed through an opening formed on a casing.

In addition, the X-Y direction input device in accordance with another aspect of the present invention further comprises at least one of a first intermediate guide means guiding an intermediate portion of said first holder in the Y-direction and a second intermediate guide means guiding an intermediate portion of said second holder in the X-direction.

In accordance with the present invention constituted as described above, if the projection exposed through the opening of the casing is shifted, for example, in the Y-direction, the first holder which engages with the operating body including said projection is actuated to shift in the Y-direction. In this instance, the detecting element held by the first holder detects the Y-direction pattern provided on the base board to obtain a shift amount of the projection in the Y-direction. Based on this shift amount of the projection, the cursor displayed on the display apparatus is shifted to any position on the Y-direction.

In a similar way, when the projection is manipulated in the X-direction, the second holder is actuated to shift in the X-direction. In this case, since the engaging portion of the operating body engages with both the first holder and the second holder in such a manner that said holders are held to cross with each other, it becomes possible to acquire a detecting accuracy and to obtain an X-Y input device having high resolution. Furthermore, the casing can be reduced in thickness since the rotary type electric parts such as a ball, a rotary encoder and so on can be omitted. Moreover, the opening formed on the casing can be substantially covered by a plurality of cover plates which are mutually shiftable independently, so that an extraneous substance such as a dust can be prevented from entering through the opening. Still further, since there are provided a plurality of cover plates, each one of the cover plates can be made small.

On the other hand, in the case where there are provided the first end-portion guide means for guiding both ends of the first holder in the Y-direction and the second end-portion guide means for guiding both ends of the second holder in the X-direction, if the projection exposed through the opening formed on the casing is manipulated in the Y-direction, said first holder is prevented from being deformed because both ends are guided by the first end-portion guide means. In the same fashion, when the projection is manipulated in the X-direction, said second holder is prevented from being deformed because both ends are guided by the second end-portion guide means. Thus, the projection can move smoothly, and it becomes possible to realize a thin X-Y direction input device having good operability.

Furthermore, in the case where there are provided the first intermediate guide means guiding an intermediate portion of the first holder in the Y-direction and the second intermediate guide means guiding an intermediate portion of the second holder in the X-direction, it becomes possible to further limit the deformation of the holders. As a result, operability and detecting accuracy of the X-Y direction input device can be further improved.

BRIEF DESCRIPTION OF THE DRAWINGS

The above and other objects, features and advantages of the present invention will become more apparent from the following detailed description and the appended claims which are to be read in conjunction with the accompanying drawings. However, the drawings are merely illustrative and not restrictive to limit the scope of the invention.

DETAIL DESCRIPTION OF THE PREFERRED EMBODIMENTS

Hereinafter, referring now to the accompanying drawings, preferred embodiments of the X-Y direction input device in accordance with the present invention are explained in detail.

First Embodiment of the Present Invention

Figure 1:
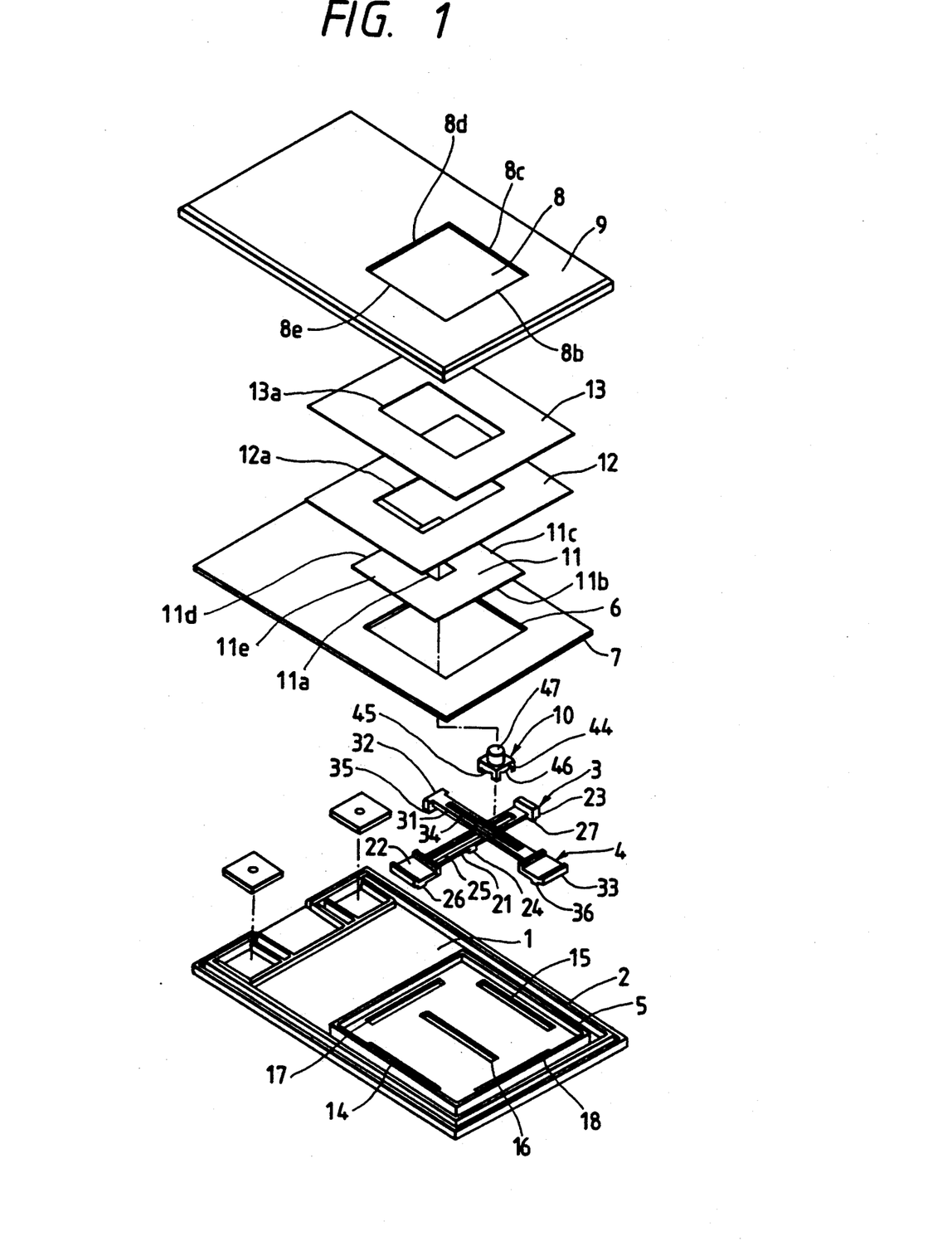
FIG. 1 is an exploded perspective view showing one embodiment of an X-Y direction input device in accordance with the present invention.
Figure 2:
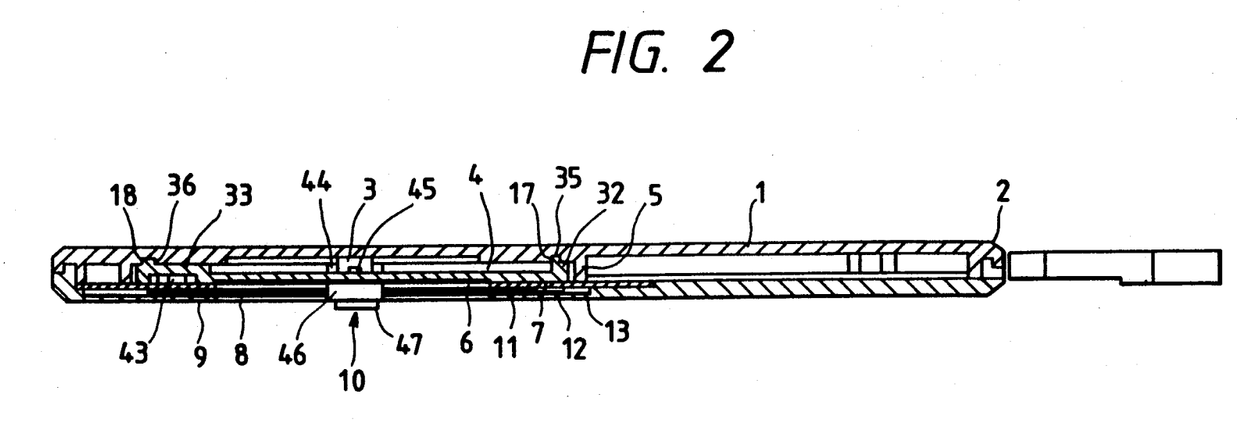
FIG. 2 is a cross-sectional view showing the X-Y direction input device of FIG. 1.
Figure 3:
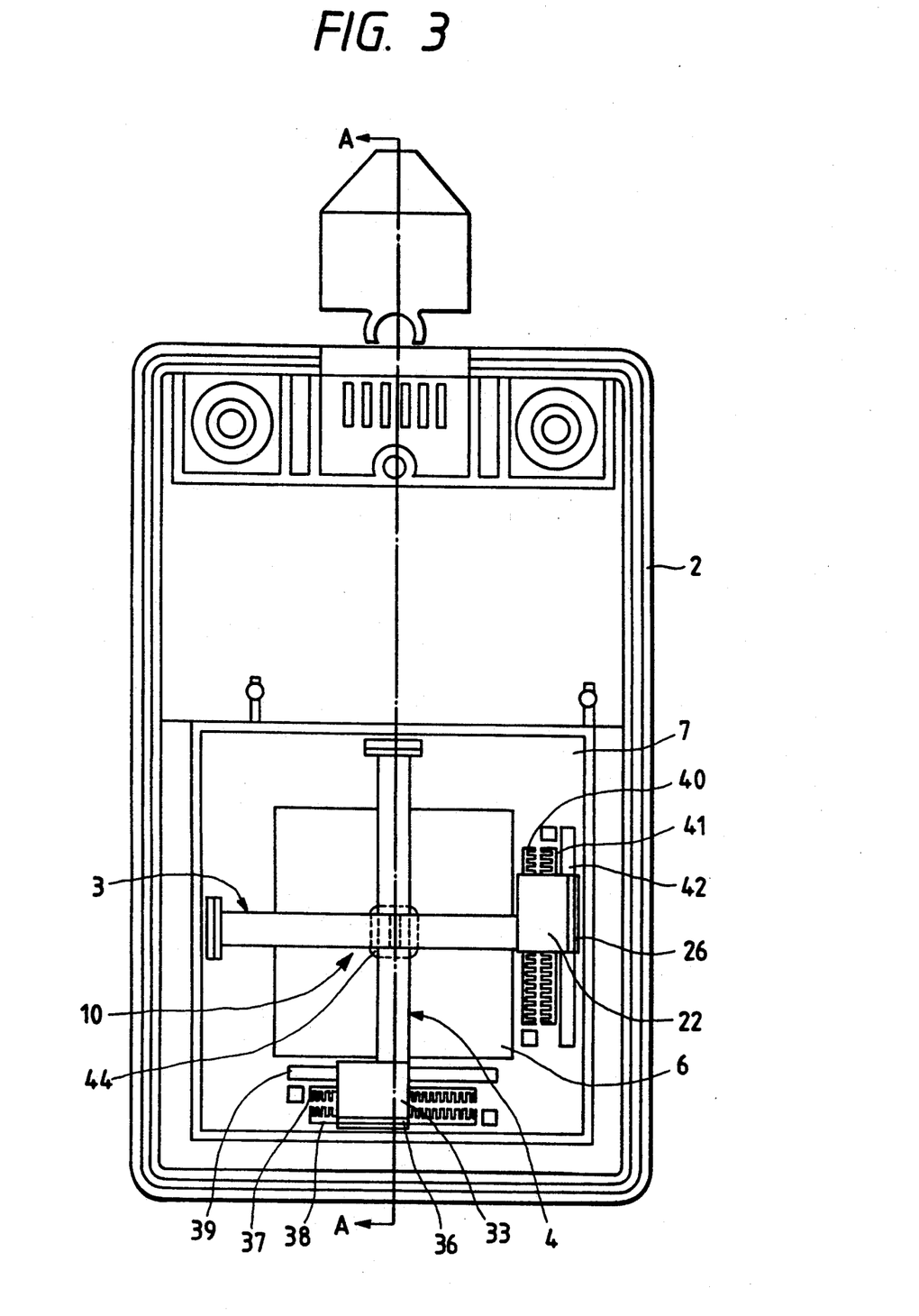
FIG. 3 is a view of a bottom surface of the X-Y direction input device seen from the bottom with its lower plate removed.
Figure 4:
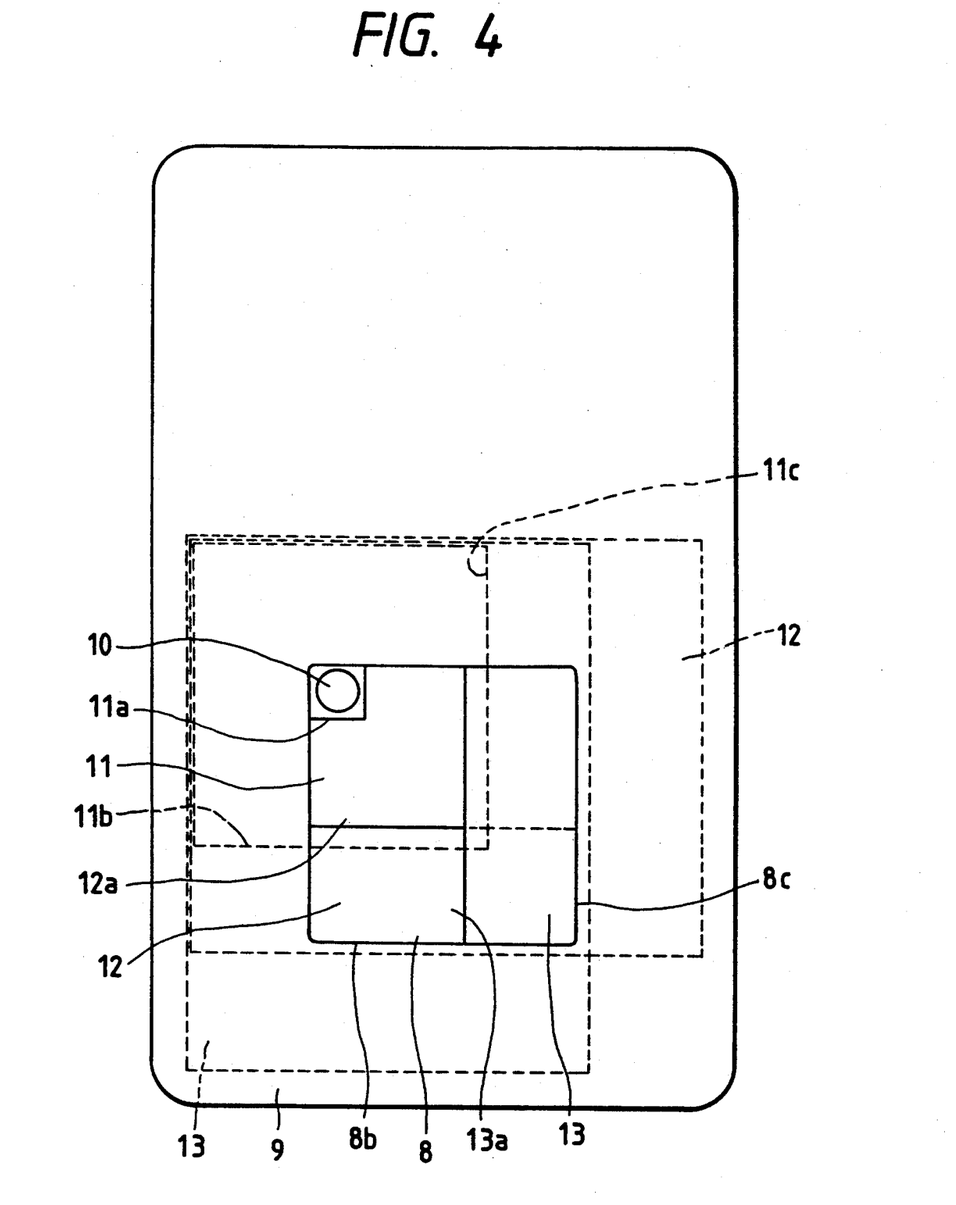
FIG. 4 is a plane view showing a condition where an operating body is in a position at one shifting end portion in the X-Y direction input device of FIG. 1.
Figure 5:
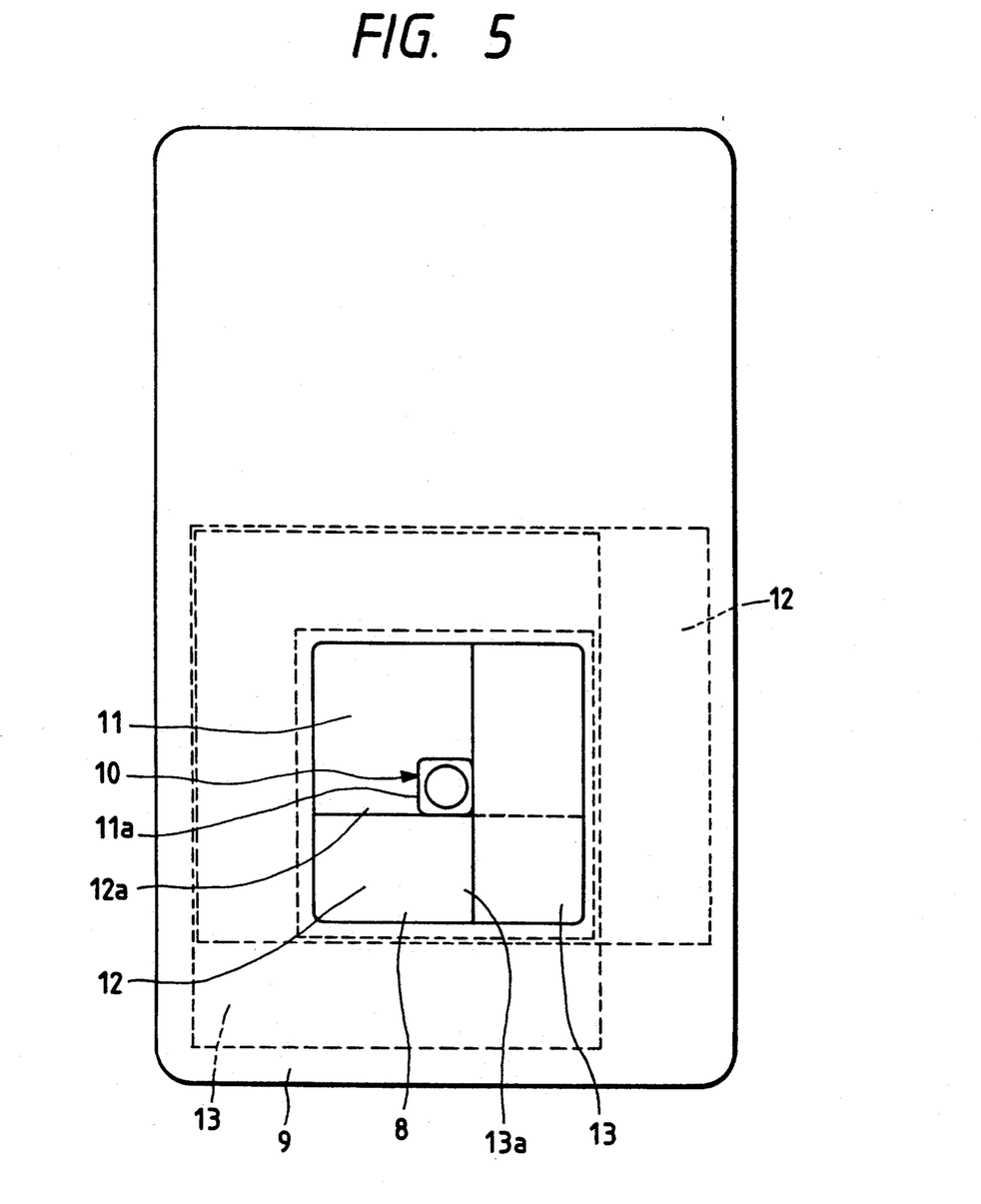
FIG. 5 is a plane view showing a condition where the operating body is in a to position at a central portion in the X-Y direction input device of FIG. 1.
Figure 6:
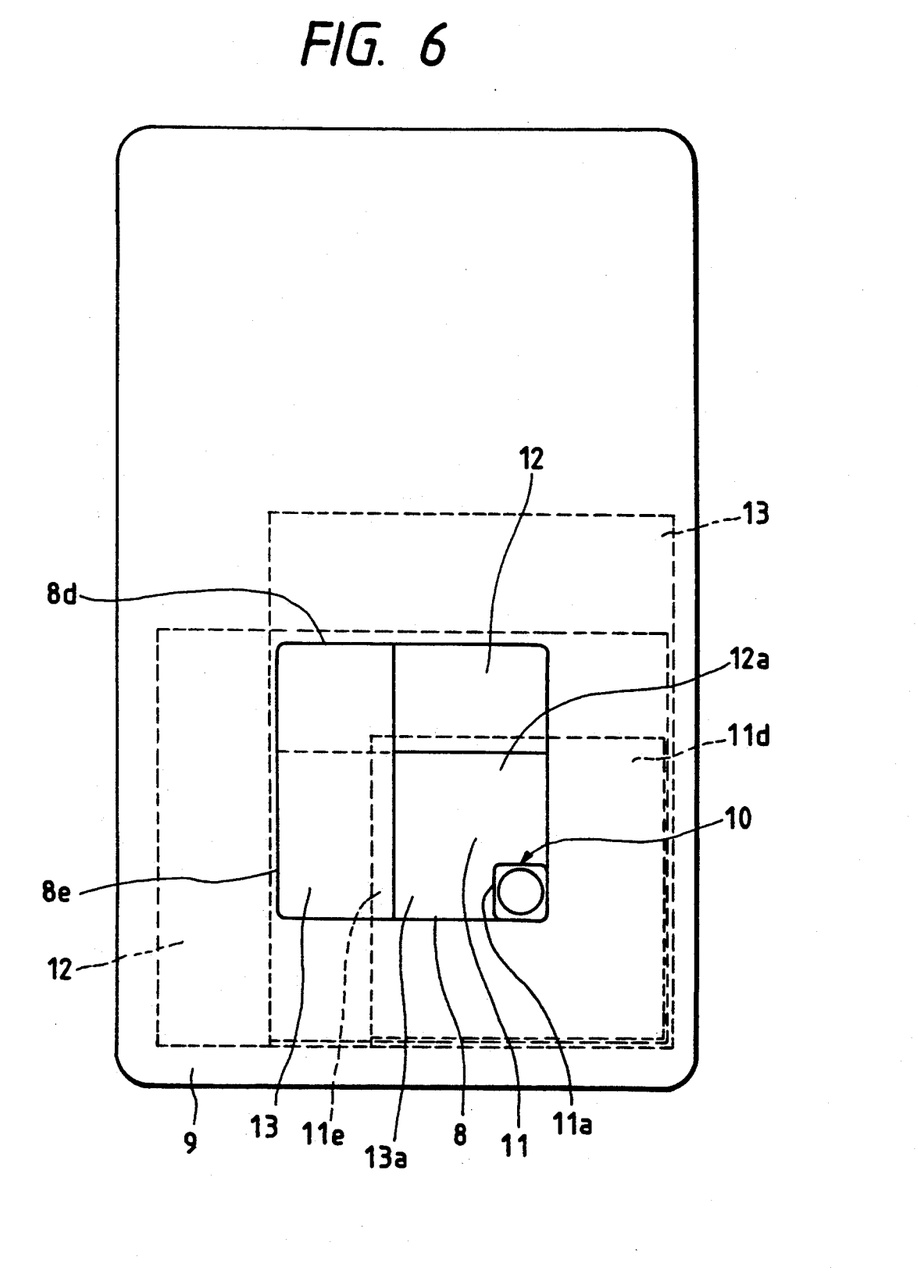
FIG. 6 is a plane view showing a condition where the operating body is in a to position at the other shifting end portion in the X-Y direction input device of FIG. 1.

FIGS. 1 through 6 disclose the first embodiment of the present invention, wherein FIG. 1 is an exploded perspective view showing the first embodiment of the X-Y direction input device in accordance with the present invention; FIG. 2 is a cross-sectional view showing the X-Y direction input device of FIG. 1; FIG. 3 is a view of a bottom surface of the X-Y direction input device seen from the bottom with its lower plate is removed; FIG. 4 is a plane view showing a condition where an operating body is in a position at one shifting end portion in the X-Y direction input device of FIG. 1; FIG. 5 is a plane view showing a condition where the operating body is in a position at a central portion in the X-Y direction input device of FIG. 1; and FIG. 6 is a plane view showing a condition where the operating body is in a position at the other shifting end portion in the X-Y direction input device of FIG. 1. Hereupon, FIG. 2 is a view corresponding to a cross-sectional view taken along a line A—A of FIG. 3.

As shown in FIG. 1, the X-Y direction input device in accordance with the present invention comprises a rectangular lower plate 1, an outer frame 2 provided on the lower plate 1, a first holder body 3 provided to be shiftable in a longitudinal direction of the outer frame 2, a second holder body 4 provided to be shiftable in a lateral direction of the outer frame 2, a square inner frame 5 provided on the lower plate 1, a base plate 7 which has a square opening 6 smaller than the inner frame 5 and is supported on the outer frame, an upper plate 9 which has a square opening 8 facing to the opening 6 and is mounted on the outer frame 2, an operating body 10 provided to be shiftable with respect to the outer frame 2, a first and a second and a third cover plates 11, 12, 13 which are interposed between the base plate 7 and the upper plate 9 so as to substantially cover the opening 8.

Above-described lower plate 1, the outer frame 2 and the upper plate 9 constitute a casing which forms an outer body. Above-described opening 8 consists of edge portions 8b, 8c, 8d, and 8e.

Assuming that a longitudinal center line of the base plate 7 (i.e. an A—A line of FIG. 3) is a Y-axis and a lateral straight line of the base plate 7 normal to the longitudinal center line is an X-axis, there are formed Y-direction grooves 14, 15 respectively disposed adjacent to the inner frame 5 and an intermediate groove 16 formed between these Y-direction grooves 14, 15 in parallel with them. In addition, there are formed X-direction grooves 17, 18 respectively disposed adjacent to the inner frame 5.

The first holder body 3 consists of a stick-shaped base portion 21 elongated in the X-direction and end portions 22, 23 provided on both ends of the base portion 21. The base portion 21 includes an engaging piece 24 which protrudes downward and engages with the intermediate groove 16, and an X-direction groove 25 formed thereon. One of the above-described end portion 22 includes an engaging piece 26 which protrudes downward and engages with the Y-direction groove 14, and the other end portion 23 includes an engaging piece 27 which protrudes downward and engages with the Y-direction groove 15.

In the same way, the second holder body 4 consists of a stick-shaped base portion 31 elongated in the Y-direction and end portions 32, 33 provided on both ends of the base portion 31. The base portion 31 includes an Y-direction groove 34 formed thereon. One of the one end portion 32 includes an engaging piece 35 which protrudes downward and engages with the X-direction groove 17, and the other end portion 33 includes an engaging piece 36 which protrudes downward and engages with the X-direction groove 18.

These grooves 14, 15 and engaging pieces 26, 27 constitute a first end-portion guide means for guiding both ends of the first holder body 3 in the Y-direction. Similarly, the grooves 17, 18 and engaging pieces 35, 36 constitute a second end-portion guide means for guiding both ends of the second holder body 4 in the X-direction.

On the lower surface of the base plate 7, as shown in FIG. 3, there are provided a pair of an XA pattern 37 and an XB pattern 38 and a common pattern 39 respectively elongated in the X-direction to face to the end portion 33 of the holder body 4. On the other hand, there are also provided a pair of an YA pattern 40 and an YB pattern 41 and a common pattern 42 respectively elongated in the Y-direction to face to the end portion 22 of the holder body 3.

On the end portion 33, as shown in FIG. 2, there is provided a detecting element such as, for example, a sliding element 43 which detects each of the XA pattern 37, the XB pattern 38, and the common pattern 39. In the same manner, there is provided a detecting element such as, for example, a sliding element which detects each of the YA pattern 40, the YB pattern 41, and the common pattern 42, though it is not shown in the drawing.

The operating body includes, as shown in FIG. 1, engaging portions 44 protruding downward from four corners thereof to engage with the holder bodies 3, 4, an engaging piece 45 engaging with the X-direction groove 25 of the first holder body 3, an another engaging piece 46 engaging with the Y-direction groove 34 of the second holder body 4, a projection 47 protruding from the cover plates 11 to 13 exposed through the opening 8.

The groove 16 and the engaging piece 24 constitutes a first intermediate guide means which guides an intermediate portion of the first holder body 3 in the Y-direction. In addition the grooves 25, 34 and engaging pieces 45, 46 constitute a second intermediate guide means which guides an intermediate portion of the second holder body 4 in the X-direction.

The first cover plate 11 has a square hole 11a at a central portion thereof so that the operating body 10 can be inserted in it. Further, the first cover plate 11 is made of a square thin plate slightly larger than the opening 8. For example, when the operating body 10 has reached at one shifting end portion as shown in FIG. 4, the end portions 11b, 11c are set to be positioned inward from the edge portions 8b, 8c of the opening 8, respectively. In the same fashion, when the operating body 10 has reached at the other shifting end portion as shown in FIG. 6, other end portions 11d, 11e are set to be positioned inward from the edge portions 8d, 8e of the opening 8, respectively.

The second cover plate 12 is made of a rectangular thin plate. A longitudinal edge of the second cover plate 12 is set to be slightly shorter than one edge of the inner frame 5, and a lateral edge of the second cover plate 12 is set to be longer than one edge of the first cover plate 11. At a central portion of the cover plate 12, there is provided a window 12a extending in the X-direction. A longitudinal edge of the window 12a is set to be substantially the same as one edge of the opening 8, and a lateral edge of the window 12a is set to be shorter than one edge of the opening 8.

The third cover plate 13 is constituted as the second cover plate 12, and includes a window 13a extending in the Y-direction.

These cover plates 11 to 13 are successively piled up on the base plate 7, and are provided to be shiftable independently with each other. Moreover, the longitudinal edge of the second cover plate 12 is disposed along the X-direction, and the longitudinal edge of the third cover plate 13 is disposed along the Y-direction. These longitudinal edges of the second and the third cover plates 12, 13 are guided by a guide wall of substantially square shape (not shown) provided on the lower surface of the upper plate 9, so that the second and the third cover plates 12, 13 do not incline even if the operation body 10 is shifted.

In this first embodiment, the projection 47 is slid by a finger of a hand when a cursor displayed on the display apparatus needs to be shifted to any position on a screen. Alternatively, by reversing the projection 47 upside down to abut on a base (not shown) and sliding it by holding the outer frame 2, the first holder body 3 shifts with respect to the Y-direction patterns 40 to 42 and the second holder body 4 shifts with respect to the X-direction patterns 37 to 39. In this case, the sliding element 43 slides on the XA pattern 37, the XB pattern 38, the common pattern 39 to output an A-phase signal and a B-phase signal of the X-direction. In response to these signals, a cursor control signal of the X-direction is outputted to the display apparatus. Similarly, the sliding element slides on the YA pattern 40, the YB pattern 41, the common pattern 42 to output an A-phase signal and a B-phase signal of the Y-direction. And, in response to these signals, a cursor control signal of the Y-direction is outputted to the display apparatus.

When the operating body 10 is manipulated, for example, at an upper left shifting end portion of FIG. 4, a right-hand side of the opening 8 of the upper plate 9 is substantially covered by the third cover plate 13. The left-hand side of the opening 8 faces to the window 13a of the cover plate 13. A lower part of this window 13a is covered by the second cover plate 12, and an upper part of the window 13a faces to the window 12a of the second cover plate 12. Further, the window 12a is covered by the first cover plate 11. That is, the opening 8 of the upper plate 9 is covered partly by the third cover plate 13, and in turn, the remaining portion of the opening 8 is covered partly by the second cover plate 12, and further, the remaining uncovered portion of the opening 8 is covered by the first cover plate 11.

Next, when the operating body 10 is manipulated from the upper left shifting end portion of FIG. 4 to the central shifting position of FIG. 5, the first holder body 11 shifts to the central shifting position and the holder bodies 3, 4 are actuated together because the engaging portion 44 of the operating body 10 has engaged with the holders 3, 4. In addition, the first holder body 3 is guided in the Y-direction since its both ends engaging pieces 26, 27 and the intermediate engaging piece 24 engage with the grooves 14 to 16, respectively. In the same manner, the second holder body 4 is guided in the X-direction since its both ends engaging pieces 35, 36 engage with the grooves 17, 18, respectively.

Moreover, since the engaging piece 45 of the operating body 10 engages with the groove 25 of the first holder body 3 and the other engaging piece 46 engages with the groove 34 of the second holder body 4, the holder body 4 is also guided at its intermediate portion through the operating body 10 in the longitudinal direction of the groove 25; i.e. the X-direction. When the operating body 10 is thus shifted to the central position of FIG. 5, the opening 8 of the upper plate 9 is covered by the cover plates 11 to 13 in the same way as the case where the operating body is positioned at the upper left shifting portion of FIG. 4.

Furthermore, when the operating body 10 is manipulated to the lower right shifting end portion as shown in FIG. 6, the first cover plate 11 shifts toward the lower right direction and the second cover plate 12 shifts toward the lower direction as shown in FIG. 6. The third cover plate 13 also shifts toward the right direction as shown in FIG. 6. Consequently, the left-hand side of the opening 8 of the upper plate 9 is covered by the third cover plate 13, and the right-hand side of the opening 8 faces to the window 13a of the cover plate 13. An upper portion of the window 13a is covered by the second cover plate 12, and its lower part faces to the window 12a of the cover plate 12. This window 12a is covered by the first cover plate 11. In other words, the opening 8 of the upper plate 9 is covered partly by the third cover plate 13 and, in turn, the remaining part of the opening 8 is partly covered by the second cover plate 12, and further, the still remaining uncovered part of the opening 8 is covered by the first cover plate 11.

In accordance with the first embodiment of the present invention, it is possible to shift the cursor displayed on the display apparatus in any direction in accordance with a mutual shifting amount of the projection 47 without necessitating a ball or a rotary encoder and so on, thereby realizing a reduction of thickness of the casing. Furthermore, since there are provided a plurality of cover plates 11 to 13 provided to be shiftable independently with each other, it becomes possible to reduce its size.

Moreover, since the first holder body 3 is guided at both ends and its intermediate portion in the Y-direction, the first holder body can be prevented from being deformed. Similarly, since the second holder body 4 is guided at both ends and its intermediate portion in the X-direction, the second holder body can be prevented from being deformed.

In addition of such anti-deformation structures of the holder bodies 3, 4, the engaging portion 44 of the operating body 10 engages with both the holder bodies 3, 4. Therefore, these holder bodies 3, 4 are held in such a manner that they cross with each other in a normal direction. As a result, detection errors can be reduced to improve detecting accuracy, thereby realizing an X-Y direction input device having high resolution.

Though, the operating body 10 and the cover plate 11 are provided as separated members in this embodiment, it is possible to form these operating body 10 and the cover plate 11 integrally in order to reduce the production cost. Furthermore, though the cover plates 11 to 13 in this embodiment are piled up on the base plate 7 in such a manner that, first of all, the first cover plate 11 is disposed on the base plate 7 and, in turn, the second cover plate 12 is disposed on the first cover plate 11, and further, the third cover plate 13 is disposed on the second cover plate 12, it is possible to change the order in which they are piled up. Still further, though this embodiment adopts a contact-type sliding element as a detecting element to be held on the holder bodies 3, 4, the present invention does not limit the detecting element to the disclosed one, and therefore it is possible to use, for example, a non-contact type detecting element such as a magnetic-type or an optical-type and so on.

Yet further, though the engaging pieces 24, 26, 27 are provided on the first holder body 3 as the first end-portion guide means and the first intermediate guide means and the grooves 14 to 16 are formed on the lower plate 1 in this embodiment, the present invention in not limited within the disclosed structure, and therefore it is possible to provide a Y-direction groove on the first holder body 3 and an engaging piece on the lower plate 1 so that the engaging piece can engage with the groove on the first holder body 3. The same modification can be applied to the second end-portion guide means and the second intermediate guide means.

Second Embodiment of the Present Invention

Figure 7:
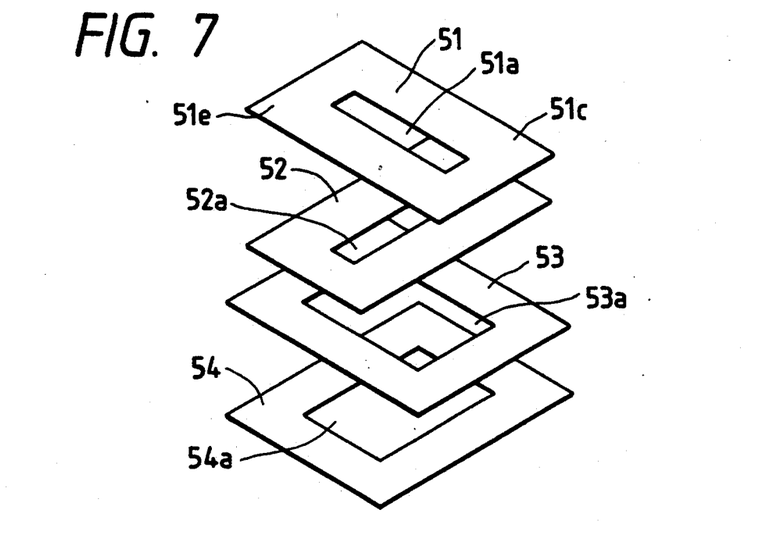
FIG. 7 is a perspective view showing cover plates of a second embodiment of the X-Y direction input device in accordance with the present invention.
Figure 8:
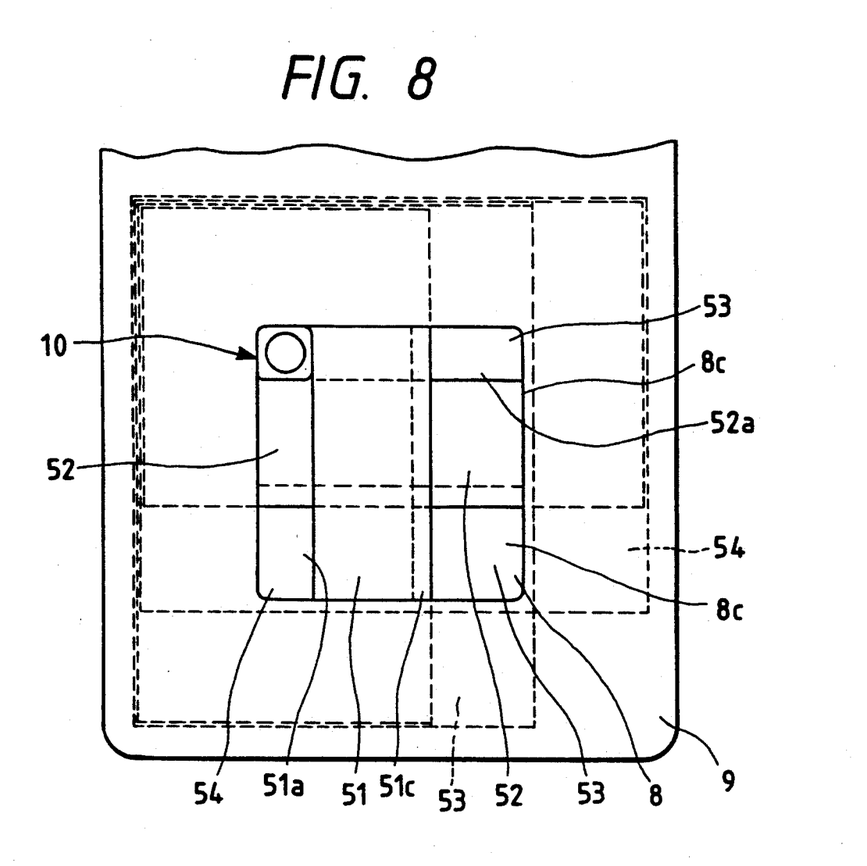
FIG. 8 is a plane view showing a condition where an operating body of the second embodiment is in a position at one shifting end portion in the X-Y direction input device of FIG. 7.
Figure 9:
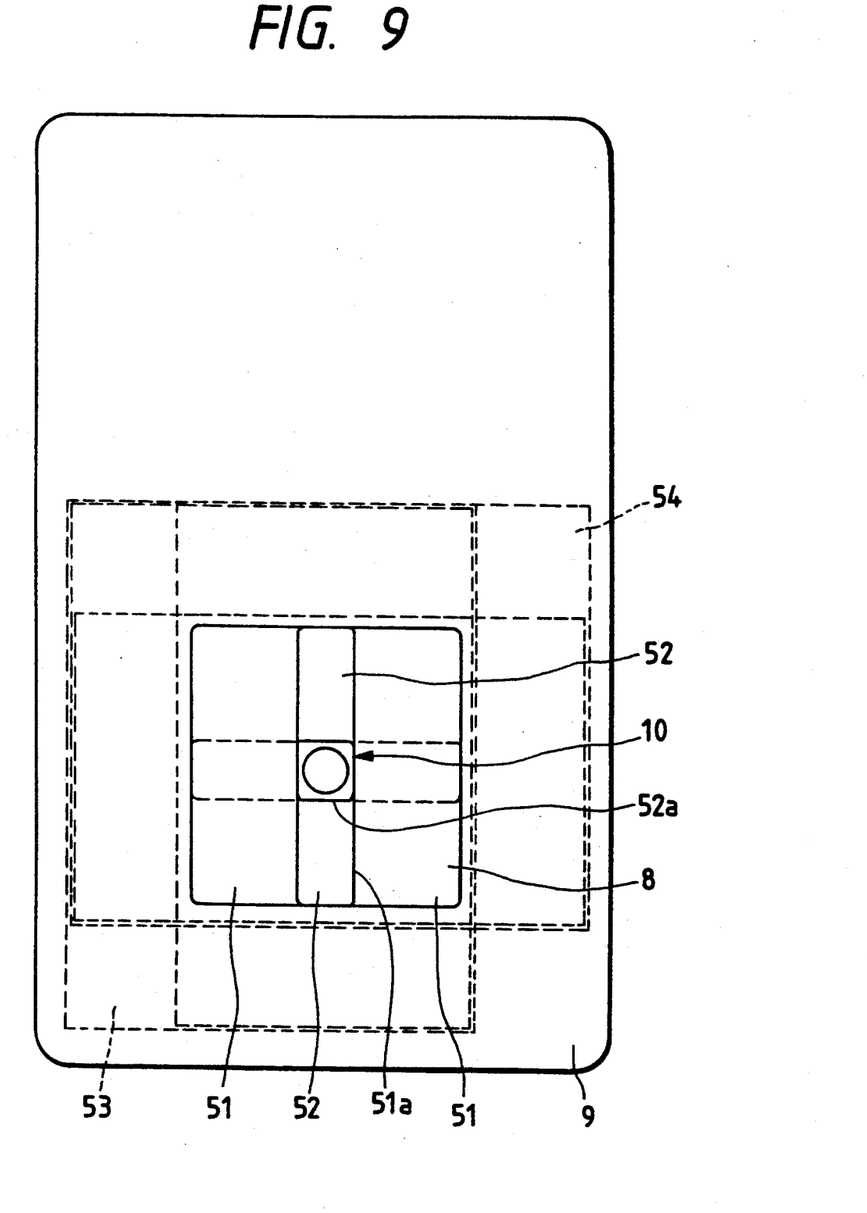
FIG. 9 is a plane view showing a condition where the operating body of the second embodiment is in a position at a central portion in the X-Y direction input device of FIG. 7.
Figure 10:
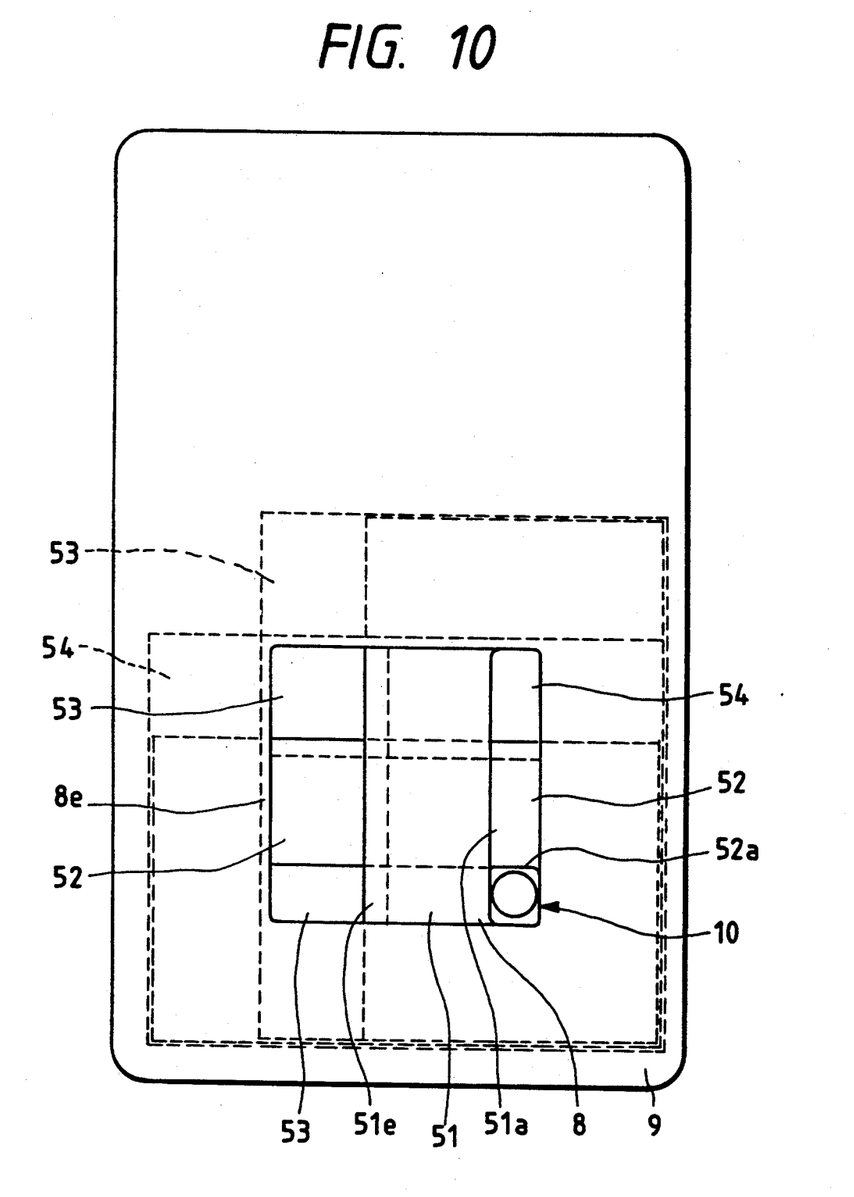
FIG. 10 is a plane view showing a condition where the operating body is in a position at the other shifting end portion in the X-Y direction input device of FIG. 7.

FIGS. 7 to 10 disclose the second embodiment of the present invention, wherein FIG. 7 is a perspective view showing cover plates of a second embodiment of the X-Y direction input device in accordance with the present invention; FIG. 8 is a plane view showing a condition where an operating body of the second embodiment is in a position at one shifting end portion in the X-Y direction input device of FIG. 7; FIG. 9 is a plane view showing a condition where the operating body of the second embodiment is in a position at a central portion in the X-Y direction input device of FIG. 7; and FIG. 10 is a plane view showing a condition where the operating body is in a position at the other shifting end portion in the X-Y direction input device of FIG. 7.

The X-Y direction input device in accordance with this second embodiment is similar to the first embodiment except that the second embodiment includes four cover plates 51 to 54 as shown in FIG. 7, instead of three cover plates 11 to 13 of the first embodiment. These cover plates 51 to 54 are respectively made of a rectangular thin plate, and successively piled up on the base plate 7 so as to be shiftable independently with each other. The first cover plate 51 has a predetermined-size longitudinal edge being set to be slightly shorter than the one edge of the inner frame 5, and a predetermined-size lateral edge being set to be longer than the one edge of the opening 8. At a central portion of this first cover plate 51, there is provided a long hole 51a into which the operating body 10 is inserted. A longitudinal size of the long hole 51a is set to be substantially equal to one edge of the opening 8, and a lateral size of the long hole 51a is set to be substantially equal to one edge of the operating body 10.

The first cover plate 51 is set in such a manner that, for example, a right end portion 51c of the cover plate 51 is positioned inward of the edge portion 8c; i.e. at left side, when the operating body 10 has reached at a left shifting end portion in the X-direction as shown in FIG. 8. Further, the first cover plate 51 is set in such a manner that a left end portion 51e of the cover plate 51 is positioned inward of the edge portion 8e; i.e. at right side, when the operating body 10 has reached a right shifting end portion in the X-direction as shown in FIG. 10.

The second cover plate 52 is constituted similarly, and includes a long hole 52a at a central portion thereof so that the operating body 10 can be inserted into the long hole 52a.

The third cover plate 53 has a predetermined-size longitudinal edge being set to be slightly shorter than the one edge of the inner frame 5, and a predetermined-size lateral edge being set to be longer than the lateral edges of the cover plates 51, 52. At a central portion of this third cover plate 53, there is provided a long window 53a extending in the Y-direction at the central portion of the cover plate 53. A longitudinal size of the long window 53a is set to be substantially equal to one edge of the opening 8, and a lateral size of the long window 53a is set to be shorter that the one edge of the opening 8.

The fourth cover plate 54 is similarly constituted so as to have a long window 54a extending in the X-direction at a central portion thereof.

Moreover, the longitudinal edge of the first cover plate 51 and the longitudinal edge of the third cover plate 53 are disposed along the Y-direction, the longitudinal edge of the second cover plate 52 and the longitudinal edge of the fourth cover plate 54 are disposed along the X-direction.

In this second embodiment, the projection 47 is slid by a finger of a hard when a cursor displayed on the display apparatus needs to be shifted to any position on a screen. Alternative, by reversing the projection 47 upside down to abut on a base (not shown) and sliding it by holding the outer frame 2, the first holder body 3 shifts with respect to the Y-direction patterns 40 to 42 and the second holder body 4 shifts with respect to the X-direction patterns 37 to 39.

When the operating body 10 is manipulated, for example, at an upper left shifting end portion of FIG. 8, a central portion of the opening 8 of the upper plate 9 is closed by the first cover plate 51. And, the left-hand side of the opening 8 faces to the long hole 51a of the cover plate 51. An upper portion and an intermediate portion of this long hole 51a are covered by the second cover plate 52, and a lower portion of the long hole 51a is covered by the fourth cover plate 54. Furthermore, an intermediate portion of the right-hand side of the opening 8 is covered by the second cover plate 52, and its upper portion and lower portion are covered by the third cover plate 53. Accordingly, the opening 8 of the upper plate 9 is covered by the cover plates 51 to 54.

Next, when the operating body 10 is manipulated from the upper left shifting end portion of FIG. 8 to the central shifting position of FIG. 9, the first cover plate 51 shifts toward a right direction in FIG. 9. And, the second cover plate 52 shifts toward a downward direction in FIG. 9. As a result, the right-hand side and the left-hand side of the opening 8 are covered by the first cover plate 51, and the intermediate portion of the opening 8 is covered by the operating body 10 and the second cover plate 52.

Furthermore, when the operating body 10 is manipulated to the lower right shifting end portion as shown in FIG. 10, the first cover plate 51 and the third cover plate 53 shift toward a right direction as shown in FIG. 10, and the second cover plate 52 and the fourth cover plate 54 also shift toward a lower direction as shown in FIG. 10. As a result, the intermediate portion of the opening 8 is covered by the first cover plate 51, and a central portion of the left-hand side of the opening 8 is covered by the second cover plate 52. The upper portion and the lower portion of the left-hand side of the opening 8 are covered by the third cover plate 53. Moreover, a central portion of the right-hand side of the opening 8 is covered by the second cover plate 52. The upper portion of the right-hand side of the opening 8 is covered by the fourth cover plate 54, and its lower portion is covered by the operating body 10. In other words, the opening 8 of the upper plate 9 is covered by the cover plates 51 to 54.

In accordance with the second embodiment thus constituted as described above, substanstially the same effect as the first embodiment can be obtained.

In all the embodiments, the cover plates are provided to mutually overlap so that these plurality of cover plates do not interfere each other even when the operating body 10 is shifted to reach at the shifting end portion.

The present invention, being thus constituted, can reduce the thickness of the casing. And further, it can increase its resolution or smooth the movement of the operating body. Consequently, it becomes possible to realize an X-Y direction input device suitable for a laptop type personal computer.

Having now fully described the present invention, it will be apparent to one of ordinary skill in the art that many changes and modifications can be made thereto without departing from the spirit and scope of the present invention as set forth herein.

What is claimed is:

1. A cursor control device for controlling the position of a cursor on a display, said cursor control device comprising:
   a lower plate;
   a base plate fixedly connected to said lower plate, said base plate defining a first opening having a plurality of edges, said base plate having a lower surface facing said lower plate;
   an upper plate fixedly connected to said lower plate such that said base plate is disposed between said lower plate and said upper plate, said upper plate defining a second opening;
   a first elongated holding member slidably disposed between said base plate and said lower plate, said first holding member extending in a first direction and being slidable in a second direction perpendicular to said first direction, said first holding member including a first detector element for generating a signal representing a motion of said first holding member;
   a second elongated holding member slidably disposed between said base plate and said lower plate, said second holding member extending in said second direction and being slidable in said first direction, said second holding member including a second detector element for generating a signal representing a motion of said second holding member;
   an engaging member slidably connected to both of said first and second holding members, said engaging member including a portion extending through said first and second openings; and
   a plurality of independently slidable cover plates disposed between said base plate and said upper plate, said plurality of cover plates cooperating to cover said first opening in said base plate, thereby preventing dust from passing through said first opening to said first and second holding members.

2. A cursor control device in accordance with claim 1 further comprising:
   an X-direction pattern formed on said lower surface of said base plate adjacent a first one of said plurality of edges; and
   a Y-direction pattern formed on said lower surface of said base plate adjacent a second one of said plurality of edges;
   wherein said first detector element is disposed to slide adjacent said X-direction pattern and said second detector element is disposed to slide adjacent said Y-direction pattern.

3. A cursor control device in accordance with claim 1 wherein said portion of said engaging member includes a square cross section having a width, and wherein said plurality of cover plates comprises:
   a first cover plate disposed adjacent base plate, said first cover plate being movable together with said engaging member;
   a second cover plate disposed between said base plate and said upper plate, said second cover plate including an opening having a first elongated window extending in the first direction, said first elongated window having a width slightly greater than said width of said engaging member; and
   a third cover plate disposed between said second cover plate and said upper plate, the opening of said third cover plate being a second elongated window extending in the second direction said second elongated window having a width slightly greater than said width of said engaging member.

4. A cursor control device in accordance with claim 1 wherein said portion of said engaging member includes a square cross section having a width, and wherein said plurality of cover plates comprises:
- a first cover plate disposed between said base plate and said upper plate, said opening of said first cover plate being longer in the first direction than in the second direction;
- a second cover plate disposed between the first cover plate and the upper plate, said opening of said second cover plate being longer in the second direction than in the first direction;
- a third cover plate disposed between said second cover plate and said upper plate, the opening of said third cover plate being a first elongated window extending in the first direction, said first elongated window having a width equal to said width of said engaging member; and
- a fourth cover plate disposed between said third cover plate and said upper plate, the opening of said fourth cover plate being a second elongated window extending in the second direction, said second elongated window having a width equal to said width of said engaging member.

* * * * *